Oct. 15, 1935.  J. BRUNSWICK  2,017,649
CELLULAR CUSHION TIRE
Filed Jan. 10, 1933  2 Sheets-Sheet 1

Inventor
Jules Brunswick
By Jennie Davis Maurin & Edmonds
Attorneys

Oct. 15, 1935.　　　　J. BRUNSWICK　　　　2,017,649
CELLULAR CUSHION TIRE
Filed Jan. 10, 1933　　　　2 Sheets-Sheet 2
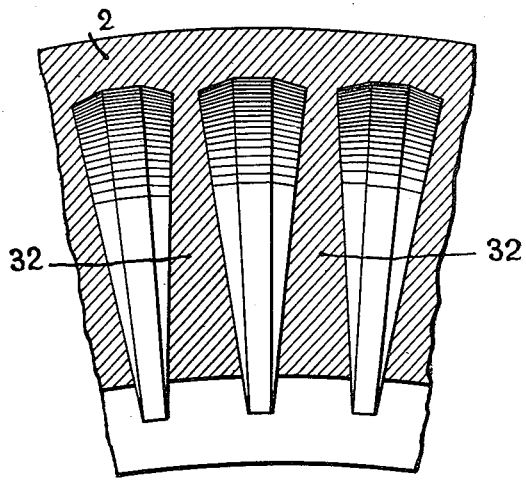
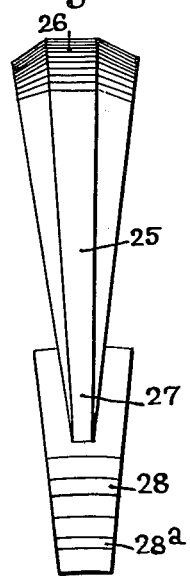
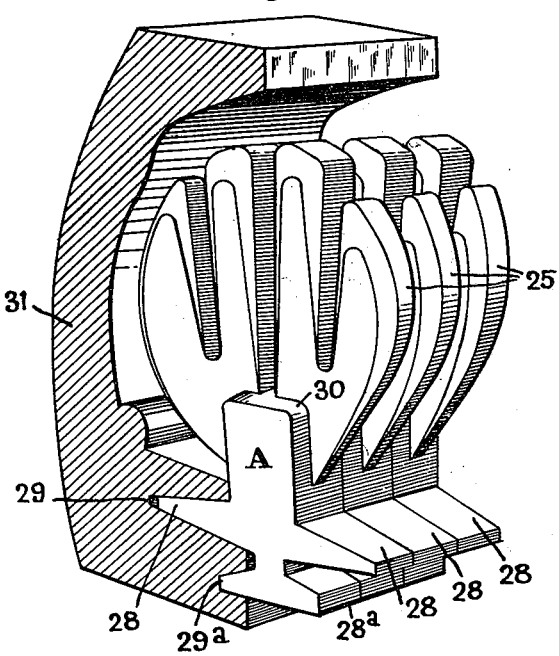

Patented Oct. 15, 1935

2,017,649

UNITED STATES PATENT OFFICE 2,017,649

CELLULAR CUSHION TIRE

Jules Brunswick, Boulogne/Seine, France

Application January 10, 1933, Serial No. 650,979
In France January 12, 1932

3 Claims. (Cl. 152—1)

This invention relates to improvements in cellular cushion tires of rubber with transverse partitions.

The transverse partitions of cellular tires heretofore known were formed either of uniform thickness or of greater thickness near the tread than near the rim. From this circumstance there results the drawback that it is impossible to obtain tires of sufficient suppleness near the tread and of a certain rigidity near the rim, as is desirable particularly for tires of large section for the wheels of motor cars.

The invention relates to a method of and means for avoiding this drawback by providing transverse partitions curtailed near the rim or of thinner section near the tread than at the beads and combining or not with reducing the number of transverse partitions near the tread than at the beads. Heretofore the metal core employed for manufacturing cellular cushion tires of rubber of the kind above referred to, has been constituted by a torus profiled by machining teeth therein in such wise that several consecutive teeth are integral with one another, so that opening of the mould is only possible if the partitions are at least as thick near the rim as at the tread. The mould for manufacturing the improved tires, on the contrary, is obtained either by milling the metal core so as to omit or augment the parts corresponding to the partitions, or by utilizing a core constituted by a suitable assembly of separate teeth so as to leave complete liberty in the choice of the form of the partitions, such choice being possible since there is no restriction imposed in the dismantling of the mould which may be effaced tooth by tooth.

The invention is hereinafter particularly described, by way of example only, with reference to the accompanying drawings in which Fig. 1 is a sectional view showing a moulded tire mounted upon a core on which it is made, together with several elements making up said core.

Fig. 12 is a view in longitudinal section to a larger scale of a tire obtained with the employment of a core constituted by assembling together a number of separate teeth.

Fig. 13 is a side view of one of the teeth.

Fig. 14 is a perspective view of a fragment of the mould and its core for making the tire structure as shown in Fig. 12.

Figure 1:
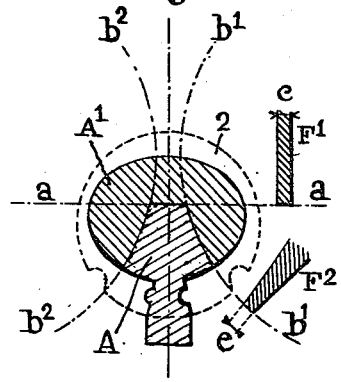
Figure 2:
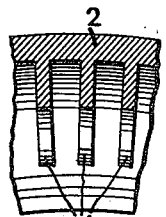
Figs. 2 and 3 are fragmentary views in longitudinal section of tires produced by the mould shown in Fig. 1.
Figure 3:
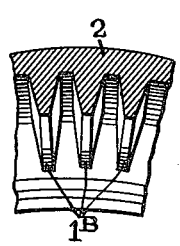

Referring to Fig. 1 there is represented by broken lines a section of the tire to be produced, and, by hatching, a section of the core serving to mould the interior of the tire. The part A of the core, shown cross-hatched, corresponds to the longitudinal annular channel or central cavity 5 of the tire to be formed. The part A' of the core, covered by simple hatching lines, is that which is milled transversely and presents teeth which form the cells in the tire, the interdental recesses in the core conforming to the partitions in the tire. These recesses are normally formed in the core by means of milling cutters which make three traverses so that their extremities describe successively the paths $aa$, $b^1b^1$, and $b^2b^2$. With this object there may be used a cylindrical milling cutter indicated at $F^1$ or a conical milling cutter indicated at $F^2$. If there is used the cylindrical cutter $F^1$, the mould produces the known form of transverse partitions $1^A$ represented in longitudinal section in Fig. 2; if there is used the conical cutter $F^2$, there are produced the transverse partitions $1^B$, also known, shown in Fig. 3.

To produce, according to the invention, partitions which are thinner at the tread than near the beads there may be effected the following operations.

Figure 4:
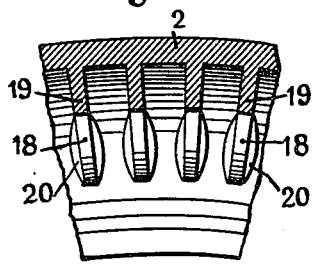
Fig. 4 is a view in longitudinal section of another tire according to the invention obtained with a mould of the type shown in Fig. 1.

The traverse $aa$, i. e., the first traverse, is effected with the cylindrical milling cutter $F'$ of diameter $c$, and the lateral traverses $b^1b^1$ and $b^2b^2$ are effected with the frusto conical cutter $F^2$ the diameter of which at the end is equal to $e$, its conicity being chosen at will. With the use of a core milled in this way there is obtained the tire shown in Fig. 4 in which the partitions 18 are thinner at 19 near the tread than at 20 along the side walls or near the bead of the tire. The opening of the mould is effected without difficulty.

Figure 5:
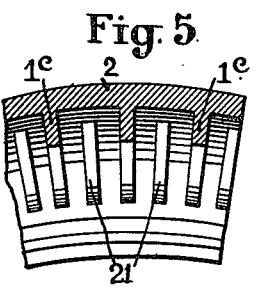
Fig. 5 shows another form of the improved tire.
Figure 6:
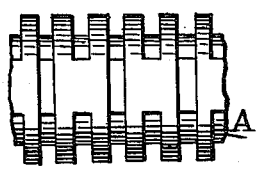
Fig. 6 is an external view of part of the core of the mould used in producing the tire shown in Fig. 5.

In forming the core every second traverse $aa$ may be omitted. With the cylindrical milling cutter there is then obtained the core shown in Fig. 6 with which there is produced the tire shown in Fig. 5 in which the partitions 21 are reduced to the side parts. In this case there are twice as many partitions on the side faces as near the tread. The frusto conical milling cutter may also be employed for the lateral traverses $b^1b^1$ and $b^2b^2$.

Figure 7:
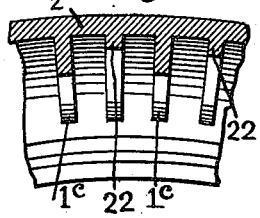
Fig. 7 shows a variant of the tire shown in Fig. 5.

On the other hand, instead of omitting every second traverse $aa$, the traverses $aa$ may be made of less depth, so as to regulate according to requirements the suppleness of the tire shown in Fig. 7 in which normal partitions $1^o$ alternate with partitions 22 of reduced height.

Figure 8:
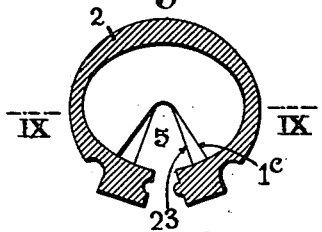
Fig. 8 is a view in transverse section of a modified form of the improved tire and Fig. 9 is a view in section in the plane IX—IX of Fig. 8.
Figure 10:
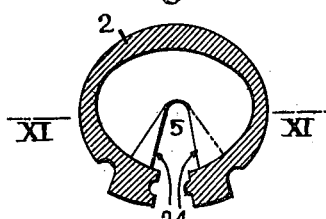
Fig. 10 shows a variant of the tire shown in Fig. 8.
Figure 9:
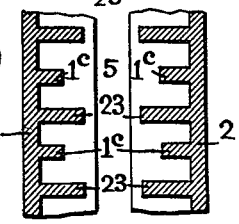
Figure 11:
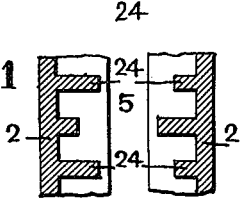
Fig. 11 is a view in section on the plane XI—XI of Fig. 10.

Further, it is possible to modify the lateral traverses $b^1b^1$, $b^2b^2$ and to deepen them so that the core of the mould diminishes the width of the longitudinal channel 5 in the tire. This deepening of the traverses may be effected symmetrically at both sides, but for every second partition only, thus producing the tire shown in Figs. 8 and 9 with alternate partitions, $1^o$ and 23; or the deepening of the traverses may be effected non-symmetrically, first at one side and then at the other, whereby there is realized the tire shown in Figs. 10 and 11 with partitions 24. In any case the base of the tire is reinforced, and, in forming the partitions, the shape may be made as to produce the tire which is very supple at the tread.

The preceding solutions, while permitting variation of the relative suppleness of the tread and of the base of the tire, are subject to certain restrictions which are entailed by the functions of requirements in opening the mould. Such restrictions may be avoided entirely by effecting the moulding operation in the manner represented by Figs. 12, 13 and 14.

In proceeding with the moulding operation in the manner represented in Figs. 12, 13 and 14 the partitions are obtained by means of a mould comprising a core formed of isolated teeth conveniently connected and assembled. The form of each tooth may be determined in such wise that the partitions will have the minimum thickness towards the tread while being reinforced at the base.

The individual teeth 25 comprise small plates which are of maximum thickness at the top 26, this thickness decreasing gradually, more or less towards the base 27. This arrangement is best seen in Fig. 13. The core of the mould is obtained by adjoining a suitable number of these teeth 25 disposed side by side as represented for example in Fig. 14 in which the plates have at the base tongues 28, 28$^a$ which are located in circular grooves 29, 29$^a$ provided in the two shells 31 of the mould, one only of which shells is shown. The extra thick portion 30 at the base of each plate effects suitable spacing of the plates. To be able to vary at will the thickness of the partitions of the tire, this extra thickness is provided when the partitions are to be more numerous and consequently thinner. Spacing members are interposed between adjoining plates, when, on the contrary, it is desired to obtain thicker partitions.

The partitions produced by the use of the plates above referred to are indicated at 32 in Fig. 12. The dismantlement of the mould is readily effected.

What is claimed is:

1. A cellular cushion tire of rubber for vehicle wheels, comprising internal transverse partitions of rubber and moulded in a single piece with the tread of the tire, said transverse partitions having a thickness which is thinner near the tread than near the rim and unsupported at the opposite end, whereby said tire has greater suppleness in the vicinity of the tread and a certain rigidity near the rim.

2. In a cellular cushion tire of rubber such as described in claim 1, said transverse partitions being free at one end and unattached to the bead part of the tire.

3. In a cellular cushion tire of rubber such as described in claim 1, said transverse partitions forming the interior of the tire into compartments larger than said partition, thereby leaving the tread of said tire over these compartments unsupported in the radial direction.

JULES BRUNSWICK.